(No Model.)
W. I. STILLMAN.
VEHICLE AXLE.
No. 351,295. Patented Oct. 19, 1886.
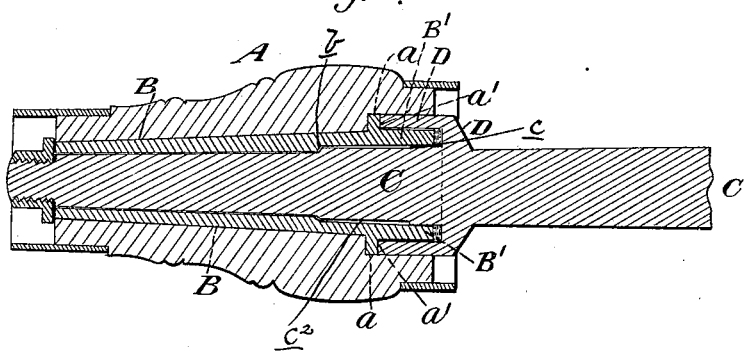
Fig. 1.
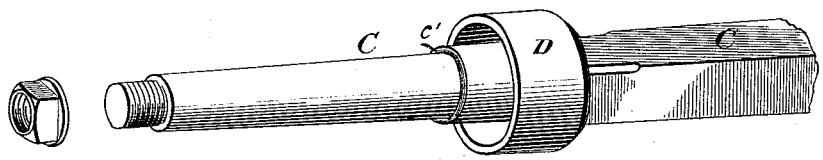
Fig. 2.
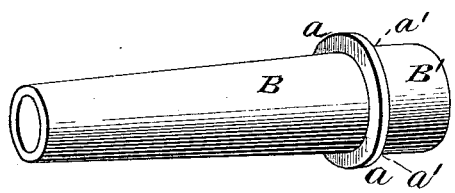
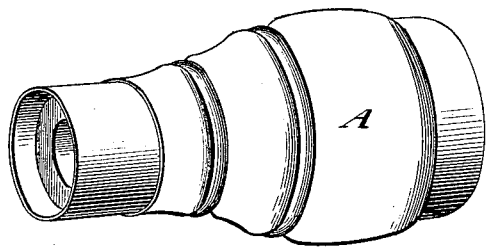
Witnesses.
A. Ruppert.
Jno. M. Henderson.
Inventor:
William I. Stillman
by Franklin H. Hough
Attorney.

UNITED STATES PATENT OFFICE.

WILLIAM I. STILLMAN, OF WATSON, NEW YORK.

VEHICLE-AXLE.

SPECIFICATION forming part of Letters Patent No. 351,295, dated October 19, 1886.

Application filed August 3, 1886. Serial No. 209,886. (No model.)

*To all whom it may concern:*

Be it known that I, WILLIAM I. STILLMAN, a citizen of the United States, residing at Watson, in the county of Lewis and State of New York, have invented certain new and useful Improvements in a Vehicle-Axle and Sand-Guard Combined; and I do hereby declare the following to be a full, clear, and exact description of the invention, such as will enable others skilled in the art to which it appertains to make and use the same, reference being had to the accompanying drawings and letters of reference marked thereon, which form a part of this specification.

Like letters refer to similar parts throughout the several views.

Figure 1 of the drawings is a representation of a longitudinal section of my combined vehicle-axle and sand-guard. Fig. 2 is a perspective view of the parts detached.

My invention relates to devices for preventing sand or other substances from entering the axle-boxes of vehicles.

A serious objection to most of the so-called "sand-bands" which have been devised for this purpose exists in the fact that they are both expensive and cumbersome.

One object of my invention is to provide the axle of the vehicle with a sand guard or cup, which is cast integral with and forms a part of the axle itself.

A further object of the invention is to form in the inner end of the hub of the vehicle, and adjacent to the skein or axle-box, a groove which extends entirely around the axle-box, the groove being of sufficient depth and form to allow the sand-guard to be received entirely within the hub, where it is concealed from sight, and will, while effectually preventing sand or other foreign substances from entering the axle-box, at the same time materially strengthen the same.

To these ends, and to such others as the invention may appertain, the same consists in the peculiar combinations and in the novel construction, arrangement, and adaptation of parts, all as more fully hereinafter described, shown in the drawings, and then sought to be specifically defined in the claim.

Referring by letter to the drawings, A represents the hub of a vehicle, provided with the axle-box B, which is provided with an enlarged portion, B', at its inner end. At the end of this enlarged portion of the axle-box, and extending entirely around the same, is a flange or extension, $a$, which is cast integral with the axle-box, and is of slightly greater diameter than the said enlarged portion, thus forming the shoulder $a'$, for a purpose hereinafter described. The interior of this box B is formed with an offset, $b$, preferably tapered, as shown.

C is the axle, and D a sand-cup, which is cast integral with and forms a part of the same. The diameter of the cup D is such as to enable it to fit closely over the enlarged portion B' of the axle-box within the hub, and its end bears against the shoulder $a'$. The axle is also formed with a shoulder, $c$, within the cup D, and with an annular offset, $c'$, beyond the same, to abut against the offset $b$ of the box B and guard against end movement. These two—the shoulder $c$ and offset $c'$—form an annular chamber, $c^2$, for the lubricant, as clearly shown in Fig. 1. The advantage of this construction will be at once evident. As the sand-cup embraces and bears directly upon the outer face of the enlarged portion of the axle-box and its end against the metallic shoulder $a'$, there is no liability of injury being done to the hub by wear, as would be the case were the groove formed directly in the wooden portion of the hub. The entire shield or cup being thus concealed within the hub, the cumbersome appearance presented by sand-bands of ordinary construction is obviated, and the axle is greatly strengthened at the point where it enters the hub.

I am aware of the Patent No. 294,632, and make no claim to the construction shown therein as forming a part of my invention. I attach importance to the flange $a$, which serves not only to strengthen the box, but also forms a bearing for the inner end of the dust-cup, and prevents the same from coming in contact with and wearing the hub, as would be the case did the dust-cup bear directly upon the wood of the hub.

Having thus described my invention and set forth its merits, what I claim to be new, and desire to secure by Letters Patent, is—

The combination, with the axle formed with dust-cup D and offset $c'$, of the axle-box B, formed with offset $b$, and with external flange, $a$, forming a shoulder, $a'$, against which the inner end of the dust-cup bears, substantially as shown and described, and for the purpose set forth.

In testimony whereof I affix my signature in presence of two witnesses.

WILLIAM I. STILLMAN.

Witnesses:
 HORACE BUSH,
 WILLIAM T. BUSH.